United States Patent
Colby et al.

[11] Patent Number: 5,821,656
[45] Date of Patent: Oct. 13, 1998

[54] MAGNETIC BEARING WITH REDUCED CONTROL-FLUX-INDUCED ROTOR LOSS

[75] Inventors: Roy S. Colby, Tariffville; Zbigniew Piech, E. Hampton, both of Conn.

[73] Assignee: United Technologies Corporation, Hartford, Conn.

[21] Appl. No.: 500,718

[22] Filed: Jul. 11, 1995

[51] Int. Cl.$^6$ .................................................. H02K 7/09
[52] U.S. Cl. ................................................... 310/90.5
[58] Field of Search ................................. 310/90.5, 154, 310/254, 156, 261

[56] References Cited

U.S. PATENT DOCUMENTS

| | | | |
|---|---|---|---|
| 3,079,574 | 2/1963 | Garcia | 336/135 |
| 3,224,818 | 12/1965 | Sixsmith | 308/10 |
| 3,865,442 | 2/1975 | Studer | 308/10 |
| 4,245,869 | 1/1981 | Scheffer et al. | 310/90.5 |
| 4,387,935 | 6/1983 | Studer | 308/10 |
| 4,683,391 | 7/1987 | Higuchi | 310/90.5 |
| 4,792,710 | 12/1988 | Williamson | 310/90.5 |
| 4,794,290 | 12/1988 | Nagasaka | 310/90.5 |
| 4,841,204 | 6/1989 | Studer | 318/254 |
| 4,866,318 | 9/1989 | Habermann et al. | 310/90.5 |
| 4,983,869 | 1/1991 | Vaidya et al. | 310/90.5 |
| 5,053,662 | 10/1991 | Richter | 310/90.5 |
| 5,095,237 | 3/1992 | Bardas et al. | 310/90.5 |
| 5,111,102 | 5/1992 | Meeks | 310/90.5 |
| 5,179,308 | 1/1993 | Malsky | 310/90.5 |
| 5,216,308 | 6/1993 | Meeks | 310/90.5 |
| 5,237,229 | 8/1993 | Ohishi | 310/90.5 |
| 5,418,414 | 5/1995 | Ackermann et al. | 310/156 |
| 5,514,924 | 5/1996 | McMullen et al. | 310/90.5 |

FOREIGN PATENT DOCUMENTS 0 053 873 A1  6/1982  European Pat. Off. .

OTHER PUBLICATIONS

International Search Report for PCT/US96/10670, mailed Mar. 6, 1997; for the PCT application that corresponds to United States Application 08/500,718.

De Bruxelles, Maurice, "Active Magnetic Bearings." 78 Hydraulic Pneumatic Mechanical Power, vol. 23, No. 271, Jul. 1977, pp. 267–269.

A. M. Dudley, "Connecting Induction Motors", McGraw–Hill Book Company, Inc., first edition pre–1925, (Contents & Introduction from 2nd edition), pp. 11–24, 91–132, 163–164, 201–204, 213–230, 371–372.

*Primary Examiner*—Steven L. Stephan
*Assistant Examiner*—Michael J. Wallace, Jr.
*Attorney, Agent, or Firm*—Gerald L. DePardo

[57] ABSTRACT

A magnetic bearing with reduced control-flux-induced rotor loss includes a rotor 14, and a stator 12 having a plurality of slots S1–S16 around which coils 150–156 of a first Phase A and coils 160–166 of a second Phase B are wound. The winding configuration provides a two pole magnetic field around a rotor/stator gap 15 which is sinusoidal and which can be directed to any location along the gap 15. The configuration minimizes discontinuities or sharp changes in control flux in the gap which thereby reduces rotor losses. Also, the stator tooth gap g1 is minimized to provide smooth flux distribution along the rotor/stator gap 15. More phases and more or less stator slots may be used.

13 Claims, 9 Drawing Sheets

MAGNETIC BEARING WITH REDUCED CONTROL-FLUX-INDUCED ROTOR LOSS

CROSS REFERENCES TO RELATED APPLICATIONS

Copending U.S. patent application Ser. No. 08/500,721 entitled, "Magnetic Bearing with Reduced Bias-Flux-Induced Rotor Loss," filed contemporaneously herewith, contains subject matter related to that disclosed herein.

TECHNICAL FIELD

This invention relates to magnetic bearings and more particularly to a magnetic bearing with reduced rotor loss.

BACKGROUND ART

It is known in the art that magnetic bearings have a rotating member (or rotor) and a stationary member (or stator) concentrically located with respect to each other and that the magnetic bearing (and its associated control circuitry) typically controls the radial or axial distance between the rotating rotor and the stationary stator. For example, the stator may be located concentrically internal to the rotor or visa versa. As is also known, a magnetic bearing may use adjustable electro-magnetic forces generated by current flowing through coils wrapped around the stator, as controlled by a control circuit, to adjust the distance between the stator and rotor.

In particular, a "radial" magnetic bearing adjusts the radial distance between the concentrically located stator and rotor. As radial forces are exerted on the rotor, the electromagnetic forces must be adjusted so as to return the gap between the stator and the rotor to a substantially constant equal value around the circumference of the rotor/stator gap. Also, distance sensors are typically used to measure the distance of the gap and to provide input signals to the control circuit to adjust the electromagnetic forces by adjusting the current through the coils.

In addition to variable electromagnetic control flux, a magnetic bearing may also have a constant DC "bias" flux to improve bearing control (e.g., linearize the current-force relationship), and/or reduce the electrical power requirements, as is known. The bias flux may be generated by a permanent magnet or by electromagnets.

Current techniques used for exerting the variable electro-magnetic control forces on radial magnetic bearings include energizing or pulsing one or more coils with electrical current to generate electromagetic flux to counter external radial forces. Common techniques for energizing coils and coil configurations include those described in U.S. Pat. No. 5,111,102, entitled "Magnetic Bearing Structure", to Meeks, and U.S. Pat. No. 5,179,308, entitled "High-Speed Low-loss Antifriction Bearing Assembly", to Malsky. However, such techniques and configurations cause discontinuities or sharp changes in the flux distribution along the gap as a function of angular position around the gap. Such sharp flux changes create eddy current and hysteresis losses in the rotor which cause electromagnetic drag on the rotor and cause heat to be generated in the rotor, thereby decreasing efficiency. Also, the higher the speed of the rotor, the greater the losses. Thus, for high speed rotor applications, such as for energy storage flywheel devices, the losses can be significant.

Additionally, increased heat in the rotor can demagnetize permanent magnets which may be embedded in the rotor. Furthermore, if the rotor is located in an isolated vacuum chamber, such as for an energy storage flywheel device, it may be difficult to cool the rotor. Thus, reducing such losses directly relates to a reduction in heat generated in the rotor.

Thus, it would be desirable to provide a magnetic bearing which does not exhibit such rotor losses.

DISCLOSURE OF INVENTION

Objects of the present invention include provision of a magnetic bearing which has reduced rotor loss.

According to the present invention, a magnetic bearing comprises a stator; a rotor, concentrically located with respect to the stator, which rotates relative to the stator, and there being a rotor/stator gap between the rotor and the stator; and winding means disposed on the stator for providing a directable two-pole magnetic field distribution along the gap which can be directed to any point along the gap, the distribution being distributed along the entire circumference of the gap.

According further to the present invention, the winding means comprises at least two phases.

According still further to the present invention, the two-pole magnetic field distribution around the gap is substantially sinusoidal.

According still further to the present invention, the stator comprises a plurality of stator teeth and a plurality of stator slots each slot being between adjacent ones of the stator teeth and the slots at the rotor/stator gap are set to a minimum distance to minimize losses in the rotor.

This invention represents a significant improvement over the prior art by providing a magnetic bearing which has an improved configuration of control windings (or coils) which provides a two-pole magnetic field distribution which avoids large discontinuities in the rotor/stator gap flux. The reduction in rotor losses include reduction in eddy current and hysteresis losses, thereby reducing electromagnetic drag and heat dissipation associated with such losses. Also, the invention allows for such a two-pole coil configuration which is independent of the number of teeth on the stator and of the number of coil drive phases. Further, the two-pole magnetic control flux field distribution of the present invention may be directed to any position around the circumference of the gap by adjusting the current supplied by the coil phases. The more stator teeth used, the smoother the sine waveform, and the lower the losses in the rotor. Also, the invention may be used with a stator lamination design that minimizes stator tooth gap at the rotor/stator gap to help maximize smoothness of flux distribution.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
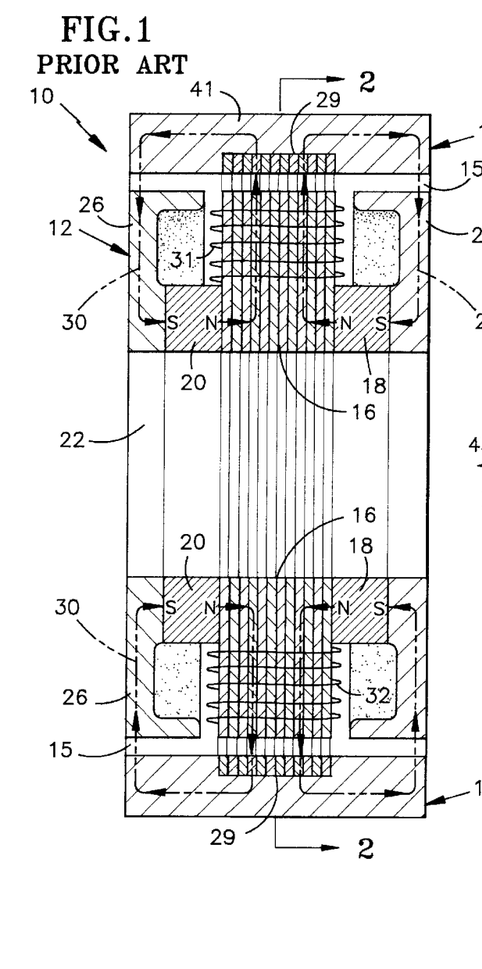
FIG. 1 is a side view of a prior art magnetic bearing having four stator teeth showing bias flux paths.

Referring to FIG. 1, a prior art radial magnetic bearing 10, comprises a stationary member or stator 12, a rotating member or rotor 14 having an outer region 41, and a gap 15 between the outer diameter of the stator 12 and the inner diameter of the rotor 14. The stator 12 comprises a plurality of centrally located laminations 16 made of a high grade low-loss high permeability electrical steel with good high frequency response characteristics, e.g., Rotelloy 5®, cobalt magnetic steel. The thickness of each lamination layer 16 is about 0.004" to 0.010" (0.010 to 0.0254 cm) and the total stacked thickness for all the laminations 16 is about 3 cm. Other lamination thicknesses, total lamination stack thicknesses, and materials may be used if desired. The distances for the rotor/stator airgap 15 may be from 0.005"–0.020", and can be controlled to an accuracy of, e.g., 0.0002", for some flywheel applications. Other gap sizes may be used if desired, depending on the application involved.

The laminations 16 are sandwiched between two permanent magnets 18, 20. Each of the permanent magnets 18, 20 have a toroidal (or doughnut) shape. Other shapes for the permanent magnets 18, 20 may be used if desired. In the center of the stator is a hollow region 22. The region 22 may alternatively be solid if desired.

The south poles of the permanent magnets 18, 20 are connected to one side of supporting arms 24, 26, respectively, at one end of the arms 24, 26 and the north poles are connected to opposite sides of the laminations 16. The other end of the arms 24, 26 make up a portion of the outer diameter of the stator 12. The arms 24, 26 are made of high strength high permeability low loss steel, e.g., low carbon (e.g., 0.01–0.02% carbon) steel, such as Arnon 5® or AISI 1018 steel. Other materials for the arms 24, 26 may be used if desired.

Figure 2:
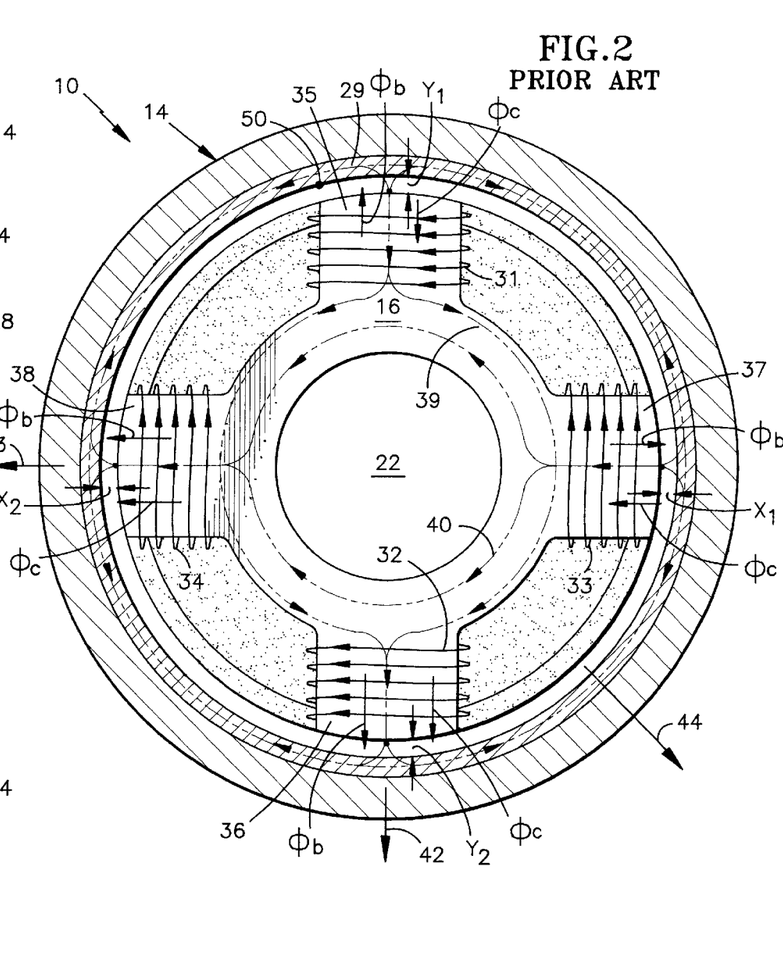
FIG. 2 is a top cutaway view of the magnetic bearing of FIG. 1 showing the four tooth stator.

The permanent magnets 18, 20 provide a constant DC magnetic field bias $\phi_b$ which provides an attraction force between the rotor 14 and stator 12 at each of the stator teeth. The bias flux path (or circuit for the magnet 18 is indicated by a dashed line 28 which exits the north pole of the permanent magnet 18, travels along the laminations 16, crosses the rotor/stator gap 15, travels along the rotor 14, crosses the gap 15 to enter the support member 24, and returns to the south pole of the permanent magnet 18 to complete the magnetic circuit flux path for the permanent magnet 18. A symmetrical magnetic bias flux circuit exists for the permanent magnet 20, as indicated by a dashed line 30. Also, electrical wires or coils 31, 32, 33, 34 are wrapped around the laminations 16 as indicated in FIGS. 1 and 2. It is also known to provide the bias flux using coils which are either wrapped around some or all of the stator teeth or in a separate toroidally shaped electromagnet (like the permanent magnet) to generate electromagnetic bias flux. In that case, the permanent magnets 18, 20 are not needed.

Other common magnetic bearing configurations are described in U.S. Pat. No. 5,111,102, entitled "Magnetic Bearing Structure", to Meeks, U.S. Pat. No. 5,179,308, entitled "High-Speed Low-loss Antifriction Bearing Assembly", to Malsky, U.S. Pat. No. 3,865,442, entitled "Magnetic Bearing", to Studer, and U.S. Pat. No. 4,387,935, entitled "Linear Magnetic Bearing", to Studer.

Referring to FIG. 2, the laminations 16 in the stator 12 have four teeth 35, 36, 37, 38 around which the coils 31–34, respectively, are wrapped. The stator may have more or fewer teeth if desired. The coils 31–34 carry current which generate variable electromagnetic fields which combine with the bias flux to produce controlled forces to compensate for external radial forces as discussed hereinafter.

Also, the gap 15 is measured in four places at the center or near the center of the teeth 35–38 of the laminations 16. In particular, the distances measured are indicated as $y_1$, $x_1$, $y_2$, $x_2$ going in a counter-clockwise direction around the stator 12. More or less locations around the gap may be measured if desired.

The electromagnetic forces operate to counter external forces exerted on the rotor 14 or stator 12 to keep the gap 15 uniform around the circumference of stator 12. For example, in FIG. 2, if external radial forces cause the rotor 14 to be forced downward as indicated by a line 42, the gap distance $y_2$ will become larger than the gap distance $y_1$. In that case, current will be driven through the coils 31, 32 in a direction so as to create a control flux $\phi_c$ which is opposite in direction to the bias flux $\phi_b$ across the gap $y_1$ and which is in the same direction as the bias flux $\phi_b$ across the gap $y_2$. As a result, the total attractive forces across the gap $y_1$ are reduced and the total attractive forces across the gap $y_2$ are increased so as to make $y_1$ and $y_2$ equal. In a similar fashion, if a horizontal radial force is exerted on the rotor, as indicated by a line 43, so as to cause the gap distance $x_2$ to be greater than the gap distance $x_1$, a current is forced through the coils 33, 34 so as to create a control flux $\phi_c$ which is in the same direction as the bias flux $\phi_b$ across the gap $x_2$ and is in the opposite direction to the bias flux $\phi_b$ across the gap $x_1$. This orientation of the control flux $\phi_c$ increases the attractive forces across the gap $x_2$ and decreases the attractive forces across the gap $x_1$ so as to force the gap $x_2$ to equal the gap $x_1$.

The current through the coils 31, 32 that creates the control flux that adjusts the gaps $y_1$ and $y_2$ is indicated by a dashed line 39 which, for the above example, is oriented downwardly along the upper stator tooth 35 and splits into two substantially equal paths along the back iron of the stator and then recombines at the lower tooth 36 of the stator 12. The flux path 39 travels across the gap $y_2$ and then splits again into two substantially equal paths and travels around half the circumference of the rotor and recombines and then crosses the gap $y_1$ to the upper tooth 35 of the stator 12. If the laminations 29 are used in the rotor 14, the control flux $\phi_c$ will remain mostly in the laminations 29.

Similarly, the current in the coils 33, 34 which creates the control flux $\phi_c$ that adjusts the gaps $x_1$ and $x_2$ for the above example causes the flux $\phi_c$ to propagate from right to left along the tooth 37 of the stator 12 and separates into two substantially equal paths along the back iron of the stator and then recombines again on the left side tooth 38 of the stator 12 as indicated by a dashed line 40. Similar to the flux 39, the flux 40 travels across the gap $x_2$ and then splits into two substantially equal paths and travels around half the circumference of the rotor 14 and recombines and crosses the gap $x_1$ to enter the stator tooth 37 on the right side. To counter external rotor forces exerted between the X and Y directions, a combination of control fluxes from both sets of coils may be used (as discussed hereinafter).

The coils 31, 32 may be connected together in series and driven by a voltage applied across them to create the control flux $\phi_c$ in the y-direction. Similarly, the coils 33, 34 may be connected together in series and driven by a voltage applied across them to create the control flux $\phi_c$ in the x-direction. Alternatively, the coils 31–34 may be driven individually. Further, alternatively, the bias flux $\phi_b$ may be oriented in the opposite direction, i.e., radially inward, if desired. In that case the direction of the control flux $\phi_c$ would be reversed for the above examples. Still further, the bias flux $\phi_b$ need not be used if desired and solely the control flux $\phi_c$ would be used to generate forces on the rotor.

Figure 3:
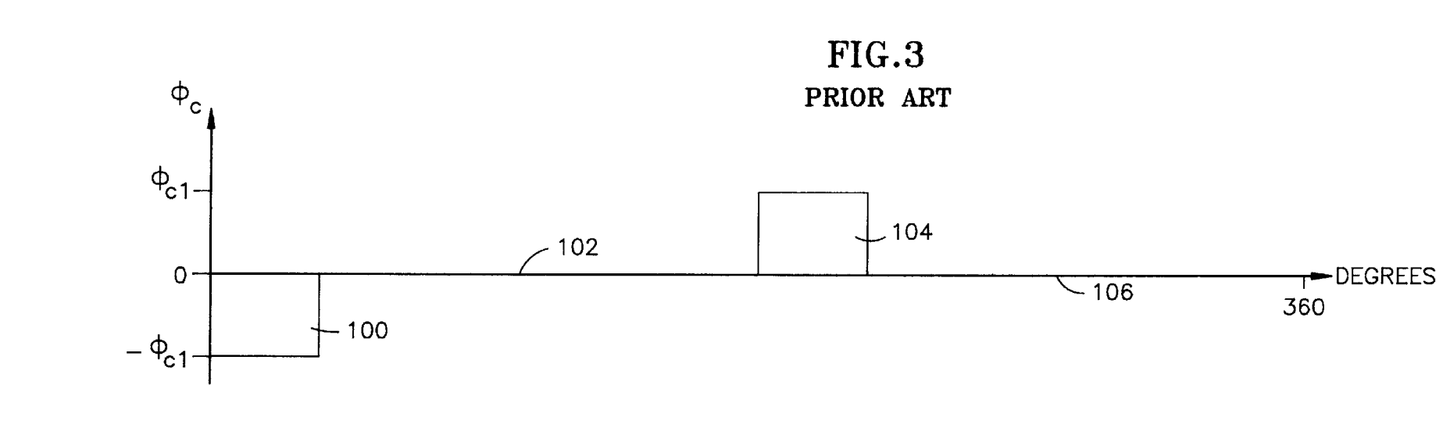
FIG. 3 is a graph of control flux along a rotor/stator gap for the four tooth stator of FIGS. 1 and 2 for a force directed along one stator tooth.

Referring to FIGS. 2 and 3, if an external force is exerted on the rotor downward in the y-direction, as indicated by the line 42, and the magnetic control flux $\phi_c$ (or flux distribution or flux density) in the rotor/stator airgap 15 is viewed from a point 50 on the rotor 14, as the rotor rotates clockwise 360 degrees around the stator 12, the control flux $\phi_c$ exhibits a series of large changes from a value of $+/-\phi_{c1}$ to close to zero. In that case, the coil 31 is energized to create the control flux $\phi_c$ opposite to the bias flux, the coil 32 is energized to create the control flux in the same direction as the bias flux, and the coils 33, 34 are not energized. As used herein, the term flux $\phi$ is used to represent flux, flux distribution, or flux density ($\phi$/Area), as the context requires.

In particular, when the point 50 is across from the stator tooth 35 a first pulse 100 having a magnitude of $-\phi_{c1}$ is seen by the rotor. In general, flux directed radially outward is designated as positive and flux directed radially inward is negative. When the point 50 is between the teeth 35, 37, across from the stator tooth 37, and between the teeth 37, 36, the rotor sees a low flux value (e.g., close to zero), as indicated by a region 102. When the point 50 is across from the stator tooth 36, a second pulse 104 having a magnitude of $\phi_{c1}$ is seen by the rotor. Similarly, when the point 50 is between the teeth 36, 38, across from the stator tooth 38, and between the teeth 38, 35, the rotor sees a low flux value as indicated by a region 106. It should be understood that instead of a square wave as shown in FIG. 3, the corners of the waveform may be rounded.

Thus, for a single rotation of the rotor 14, a given point (such as the point 50) on the rotor sees a number (e.g., 4 in the previous example) of large abrupt changes in the control flux. These flux changes cause eddy current and hysteresis losses in the rotor which induce heat and torque (electromagnetic drag) on the rotor as discussed hereinbefore in the Background Art section. The faster the rotor rotates the greater these losses become. For speeds above 10,000 rpm, the losses can be significant. Also, the sharper the change in control flux, the more high frequencies are generated in the rotor which further contributes to such losses.

Figure 4:
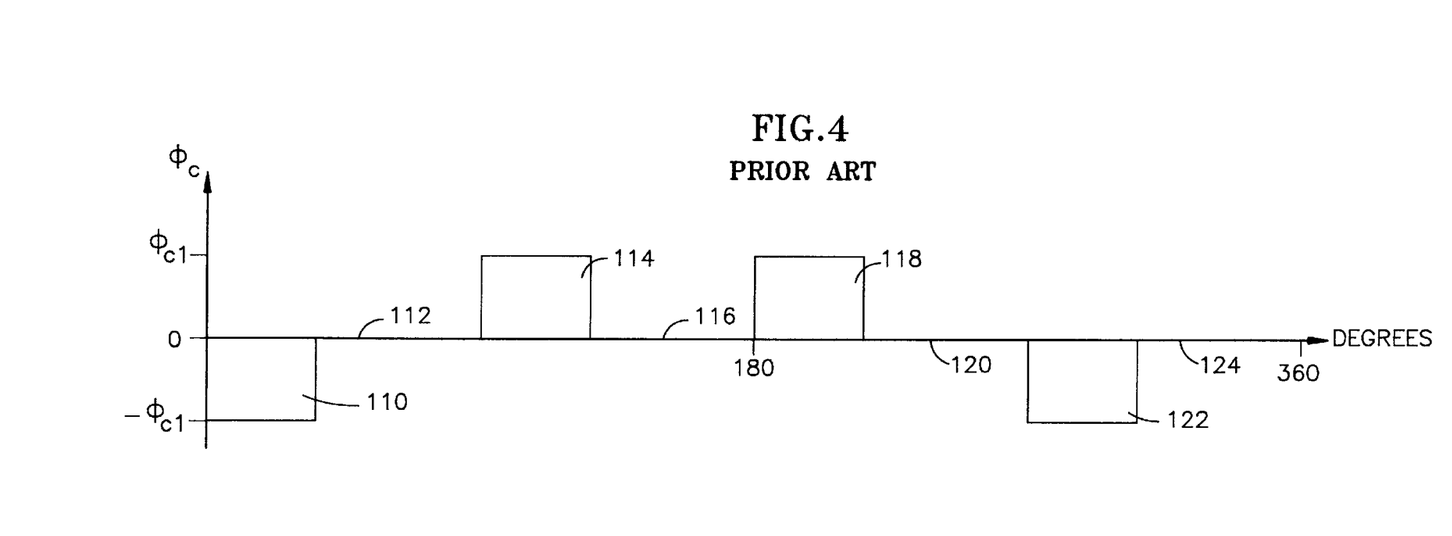
FIG. 4 is a graph of control flux along a rotor/stator gap for the four tooth stator of FIGS. 1 and 2 and for a force directed between two stator teeth.

Alternatively, referring to FIGS. 2 and 4, if the force vector on the rotor for the above example is half-way between the stator teeth 38, 35 pointing radially outward (i.e., in the $-45$ degree direction between the X and Y axes) as indicated by a line 44, all four coils may be energized. In particular, the coils 31, 34 would be energized to create the control flux $\phi_c$ opposite to the bias flux $\phi_b$, and the coils 33, 32 would be energized to create the control flux $\phi_c$ in the same direction as the bias flux to increase the attractive forces in $-45$ degree direction between the x and y axes. In that case, if the magnetic control flux $\phi_c$ in the rotor/stator airgap 15 is viewed from the point 50 on the rotor 14, as the rotor rotates clockwise 360 degrees around the stator 12, the control flux $\phi_c$ exhibits a series of large changes from a value of $+/-\phi_{c1}$ to about zero as shown in FIG. 4.

In particular, when the point 50 is across from the stator tooth 35 a first pulse 110 having a magnitude of $-\phi_{c1}$ is seen by the rotor. When the point 50 is between the teeth 35, 37, the rotor sees a low flux value (e.g., close to zero), as indicated by a region 112. When the point 50 is across from the stator tooth 37, a second pulse 114 having a magnitude of $\phi_{c1}$ is seen by the rotor. Similarly, when the point 50 is between the teeth 37, 36, the rotor sees a low flux value as indicated by a region 116. When the point 50 is across from the stator tooth 36, a third pulse 118 having a magnitude of $\phi_{c1}$ is seen by the rotor. Similarly, when the point 50 is between the teeth 36, 38, the rotor sees a low flux value as indicated by a region 120. When the point 50 is across from the stator tooth 38, a fourth pulse 122 having a magnitude of $-\phi_{c1}$ is seen by the rotor. Lastly, when the point 50 is between the teeth 38, 35, the rotor sees a low flux value as indicated by a region 124. It should be understood that instead of a square wave as shown in FIG. 4, the corners of the waveform may be rounded.

Thus, for a single rotation of the rotor 14, a given point (such as the point 50) on the rotor sees a number (e.g., 8 in the previous example) of large abrupt changes in the control flux. These flux changes cause eddy current and hysteresis losses in the rotor which induce heat and torque (electromagnetic drag) on the rotor as discussed hereinbefore.

Figure 5:
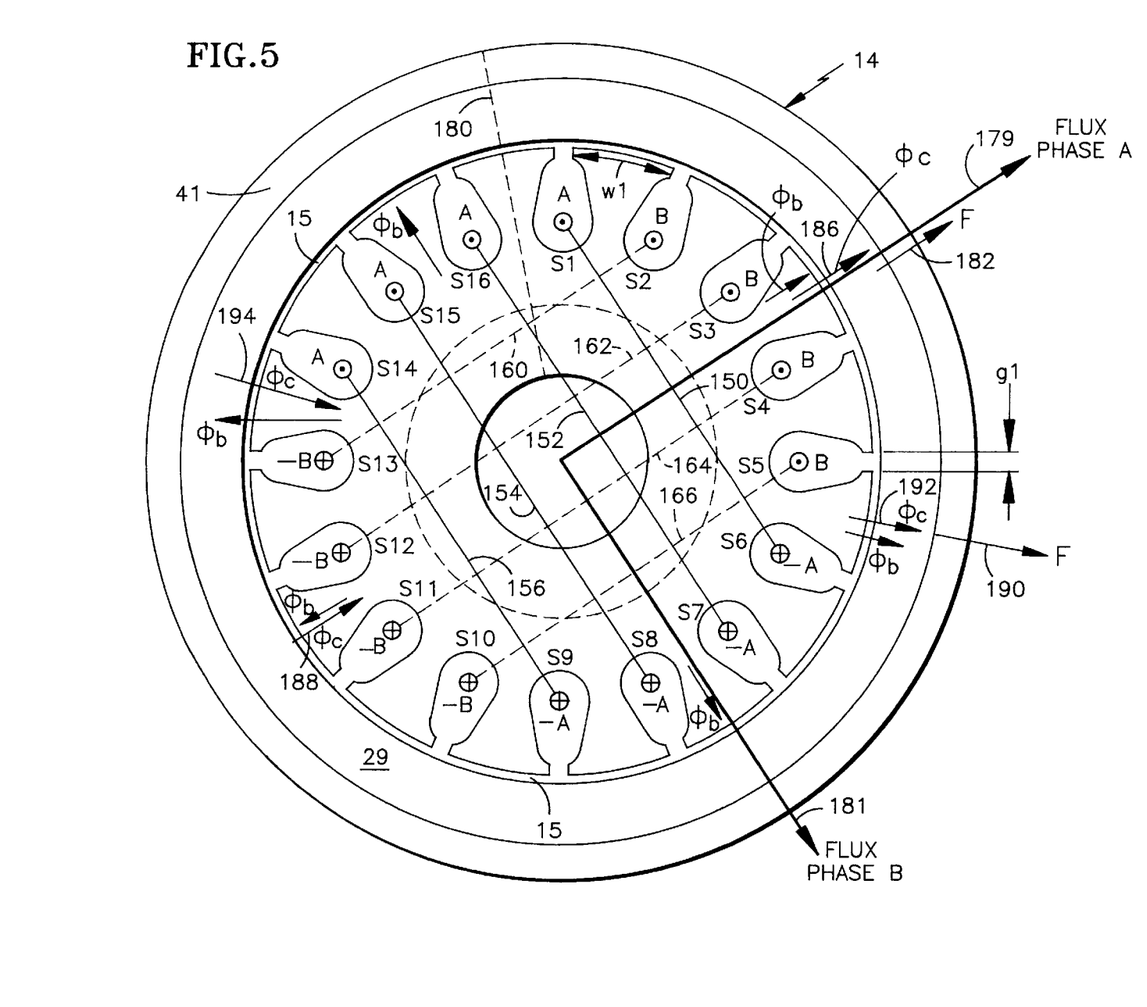
FIG. 5 is a top cutaway view of a magnetic bearing having a 16 tooth stator with a winding configuration in accordance with the present invention.
Figure 6:
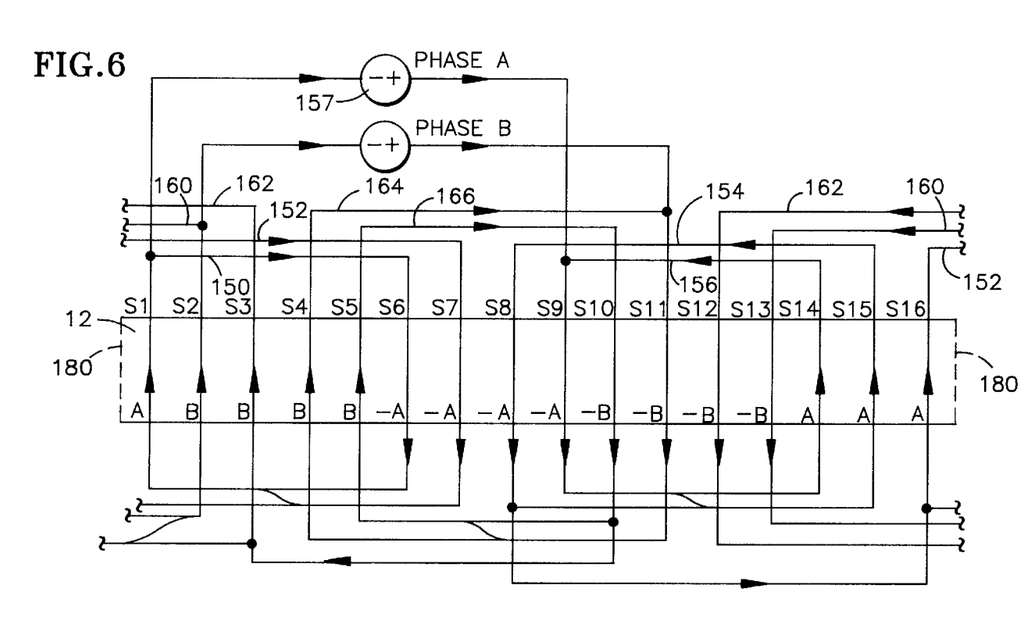
FIG. 6 is a side laid-out view of the 16 tooth stator of FIG. 5 showing the winding connections, in accordance with the present invention.

Referring to FIGS. 5 and 6, a radial magnetic bearing of the present invention has a coil winding configuration that minimizes such control flux induced rotor losses by providing a substantially sinusoidal directable two-pole magnetic field for the control flux $\phi_c$. Also, the bearing has a 16 tooth stator and a permanent magnet bias flux $\phi_b$ which is oriented radially outwardly from each of the stator teeth such as that described hereinbefore with FIGS. 1 and 2. The direction of the bias flux may be reversed if desired, as discussed hereinbefore. In particular, the magnetic bearing has a two phase winding configuration with a first phase A comprising four coils 150, 152, 154, 156, wrapped through opposing slots. More specifically, for Phase A, the coil 150 is wrapped through the slots S1, S6, the coil 152 is wrapped through the slots S16, S7, the coil 154 is wrapped through the slots S15, S8, and the coil 156 is wrapped through the slots S14, S9. The coils 150–156 of Phase A are also connected together in series, parallel, or mixed, to form Phase A and driven by a Phase A voltage source 157, as indicated in FIG. 6. Also, the winding configuration has a second phase B comprising four coils 160, 162, 164, 166 wrapped through the remaining opposing slots. More specifically, for phase B, the coil 160 is wrapped through the slots S2, S13, the coil 162 is wrapped through the slots S3, S12, the coil 164 is wrapped through the slots S4, S11, and the coil 166 is wrapped through the slots S5, S10. The coils 160–166 of Phase B are also connected together in series, parallel, or mixed, to form Phase B and driven by a Phase B voltage source 158, as indicated in FIG. 6. In actual practice the sources 157, 158 would be embedded within a control circuit (not shown) which computes the amount of current to be provided to each phase based on gap distance (from gap distance sensors), as discussed hereinbefore in the Background Art section hereof.

The stator tooth design may be the same any of the embodiments described in Copending U.S. patent application Ser. No. 08/500,721 entitled, "Magnetic Bearing with Reduced Bias-Flux-Induced Rotor Loss," filed contemporaneously herewith. Other stator tooth designs may be used if desired, e.g., straight radially projected square teeth or straight teeth with circumferentially protruding head region near the gap 15 (as discussed in the aforementioned Copending Patent Application). However, if the tooth gap g1 is minimized, the resultant control flux distribution along the gap 15 will exhibit a more smooth approximation of a two-pole magnetic field sine wave and thereby minimize control flux induced rotor losses.

Figure 7:
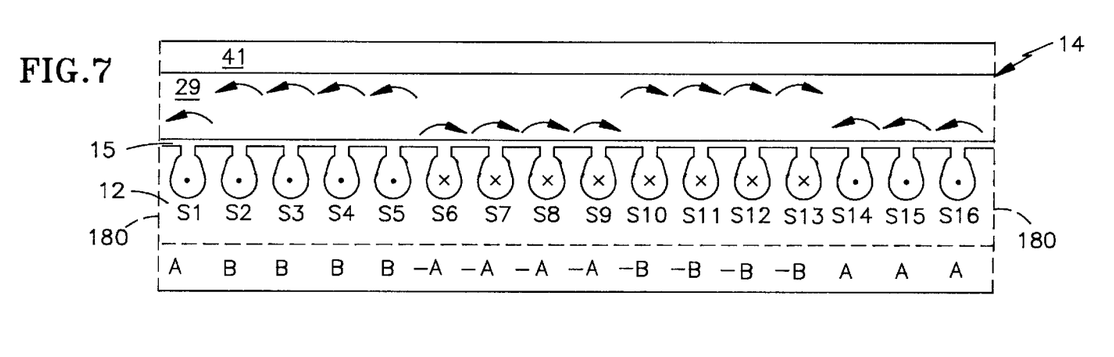
FIG. 7 is a top laid-out view of the 16 tooth stator of FIG. 5 showing the current directions, in accordance with the present invention.

Referring to FIG. 7, a top view of the 16 tooth stator 12 of FIG. 5 cut at a line 180 and laid out flat (as in FIG. 6) is shown. Electrical current flowing through a given slot (S1–S16) out of the page is designated by a dot(•) and current flowing through a given slot (S1–S16) into the page is designated by a cross(x). Referring to FIG. 5, the direction of control flux for a given phase is perpendicular to the lines 150–156, 160–166 for the coils for that phase. In particular, the direction for the control flux for positive Phase A is indicated by a line 179, and the direction for the control flux for positive Phase B is indicated by a line 181.

Figure 8:
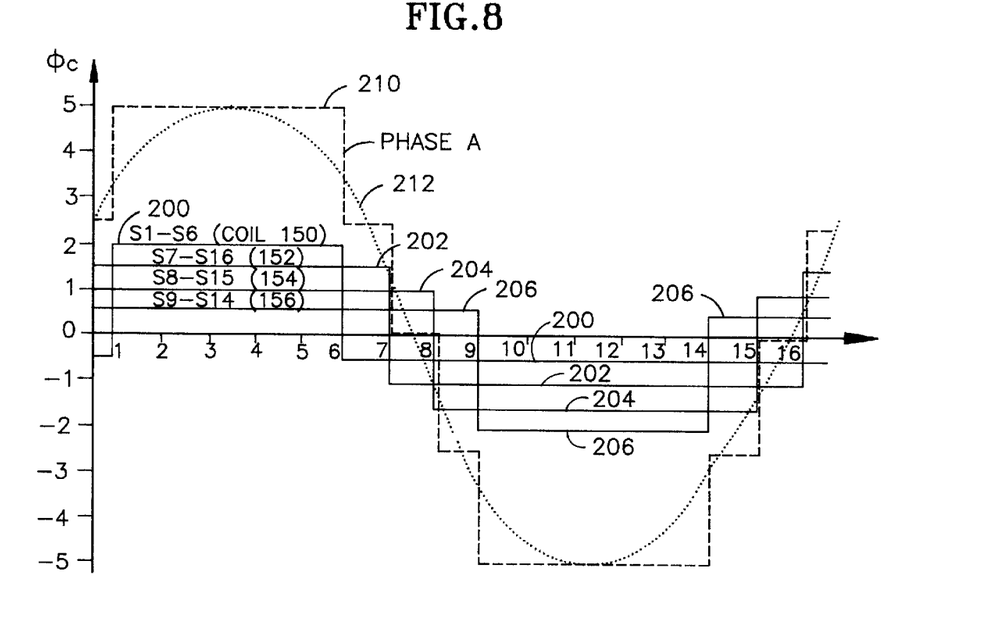
FIG. 8 is a graph of control flux along the rotor/stator gap of the 16 tooth stator magnetic bearing of FIG. 5 with one phase energized, in accordance with the present invention.

Referring now to FIGS. 5–8, if a force is exerted on the rotor 14 in the direction of a line 182 (FIG. 5), current will flow through Phase A and no current will flow through Phase B because the direction of the force 182 is parallel to the flux for Phase A. The current provided to Phase A is the same for each of the coils 150–156. Referring to FIG. 8, the control flux generated in the gap 15 by current flowing through each of the coils 150–156, individually, is indicated by curves 200–206, respectively. The regions of the curves 200–206 above zero indicate control flux projecting radially outward across the gap 15 (in the same direction as the bias flux) in the corresponding portions of the gap 15 shown in FIG. 7, as collectively indicated by a line 186 (FIG. 5), thereby increasing the rotor/stator attractive forces in that region of the gap 15. Symmetrically, regions of the curves 200–206 below zero indicate control flux projecting radially inward across the gap 15 (opposite to the bias flux) in the corresponding portions of the gap 15 shown in FIG. 7, as collectively indicated by a line 188 (FIG. 5), thereby decreasing the rotor/stator attractive forces in that region of the gap 15.

Because the total flux is conserved around the gap 15, the area under the curve 200 above zero must be equal to the area of the curve 200 below zero. In particular, for the coil 150 and its associated flux curve 200, the flux distribution (or flux density) generated between the teeth S1–S6, looking from left to right from S1 to S6 in FIG. 7 (or looking clockwise from S1 to S6 in FIG. 5), is a large value, and the flux density generated between the teeth S6-S1, looking from left to right from S6 to S1 in FIG. 7 (or looking clockwise from S6 to S1 in FIG. 5), is a smaller value than that above the curve because the gap area (in particular, the length) over which the flux is distributed is larger. A similar relationship exists for the coils 152–156 and the associated flux curves 202–206, respectively, as indicated in FIG. 8.

If the curves 200–206 are summed together, the total resultant flux in the gap 15 induced by Phase A is indicated by a dashed line 210. In actual practice, the edges of the waveforms 200–206 would be rounded, and the resultant flux curve will resemble a sine-wave as indicated by a dotted line 212. The positive half of the waveform 212 is a first magnetic field pole and the negative half of the waveform 212 is a second magnetic pole. Both poles assist in countering the force 182 exerted on the rotor. Thus, as the rotor 14 rotates, a given point on the rotor, such as the point 50, will see a substantially smooth two pole magnetic field, thereby reducing or eliminating large discontinuities in the control flux while also minimizing the number of changes in direction of the control flux in the gap 15. Thus, the present invention reduces the control flux induced rotor losses.

Figure 9:
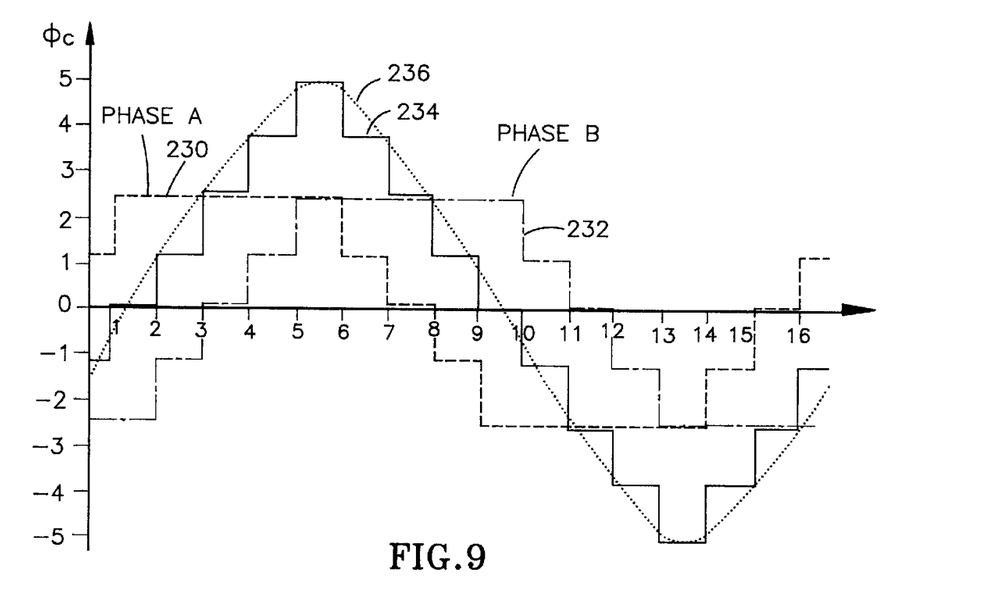
FIG. 9 is a graph of control flux along the rotor/stator gap of the 16 tooth stator magnetic bearing of FIG. 5 with two phases energized, in accordance with the present invention.

Referring to FIG. 9, the two-pole magnetic control flux field of the present invention may be directed to any position around the circumference of the gap 15 by adjusting the current supplied to the coils and, thus, the flux generated by the coils, of the two Phases A,B. In particular, if a force is exerted on the rotor 14 in a direction 45 degrees between the flux directions of the Phase A (line 179) and Phase B (line 181) coils, as indicated by a line 190 (FIG. 5), both Phase A and Phase B flux are needed to counter the force. In particular, the resultant flux curve for Phase A is indicated by a curve 230, and the resultant flux curve for Phase B is indicated by a curve 232. The flux in the gap 15 will be the sum of the two Phase flux curves 230, 232, as indicated by a solid line 234. The actual flux will be rounded and the overall curve will resemble a sinewave as indicated by a dotted line 236.

As discussed hereinbefore, the region of the curve 236 above zero indicates control flux projecting radially outward across the gap 15 (in the same direction as the bias flux) in the corresponding portions of the gap 15 shown in FIG. 7, as indicated by a line 192 (FIG. 5), thereby increasing the rotor/stator attractive forces in that region of the gap 15. Symmetrically, the region of the curve 236 below zero indicates control flux projecting radially inward across the gap 15 (opposite to the bias flux) in the corresponding portions of the gap 15 shown in FIG. 7, as indicated by a line 194 (FIG. 5), thereby decreasing the rotor/stator attractive forces in that region of the gap 15.

Figure 10:
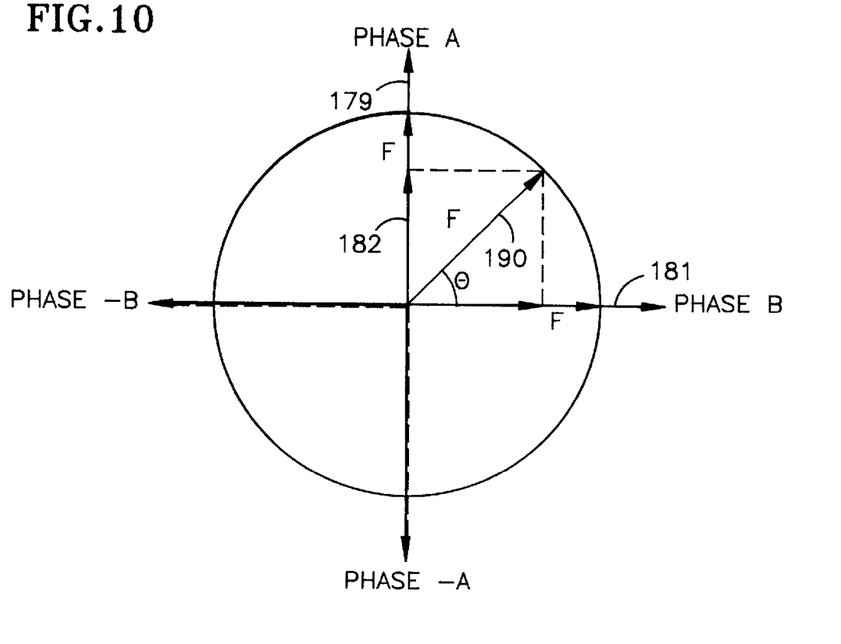
FIG. 10 is a vector graph showing force and flux vectors required for each phase of a 2 phase system, in accordance with the present invention.

Referring to FIG. 10, as discussed hereinbefore, the two pole control flux may be directed to any portion around the circumference of the gap 15 by adjusting the flux generated by the coils (and thus the current flowing through the coils) of the Phases A,B. This may be illustrated by viewing the two Phases A,B as the two vectors 179, 181 oriented 90 degrees apart. In general, the flux generated by the coils is proportional to the current flowing through the coils. If a force vector F is solely along the flux path for Phase A, as in the first example of FIG. 8 above, only Phase A flux is used and the value of the current is determined by the amount of the force F along Phase A. If the force vector F is oriented at a angle θ between the two phases A,B, as in the example of FIG. 9, the amount of current needed in phases A,B will be the vector components of the force vector F. In particular, for a two phase system, the current for Phase A is F*Sin(θ) and the current for Phase B is F*Cos(θ). It should be understood that to obtain certain force vectors the current in one or both of the Phases A,B may need to be reversed from that shown in FIGS. 5, 6, 7.

Also, if there is an imbalance in the rotor such that a portion of the rotor 14 exerts more (or less) outward radial forces than the other portions of the rotor, e.g., if a portion of the rotor is heavier, there will be a force vector which rotates with the rotor. In that case, the invention also reduces rotor losses over the prior art. In particular, the invention would provide a rotating magnetic pole flux distribution which would follow the region of the rotor generating the imbalance force. Thus, the rotor would see the same control flux at all times, thereby minimizing rotor losses.

Figure 11:
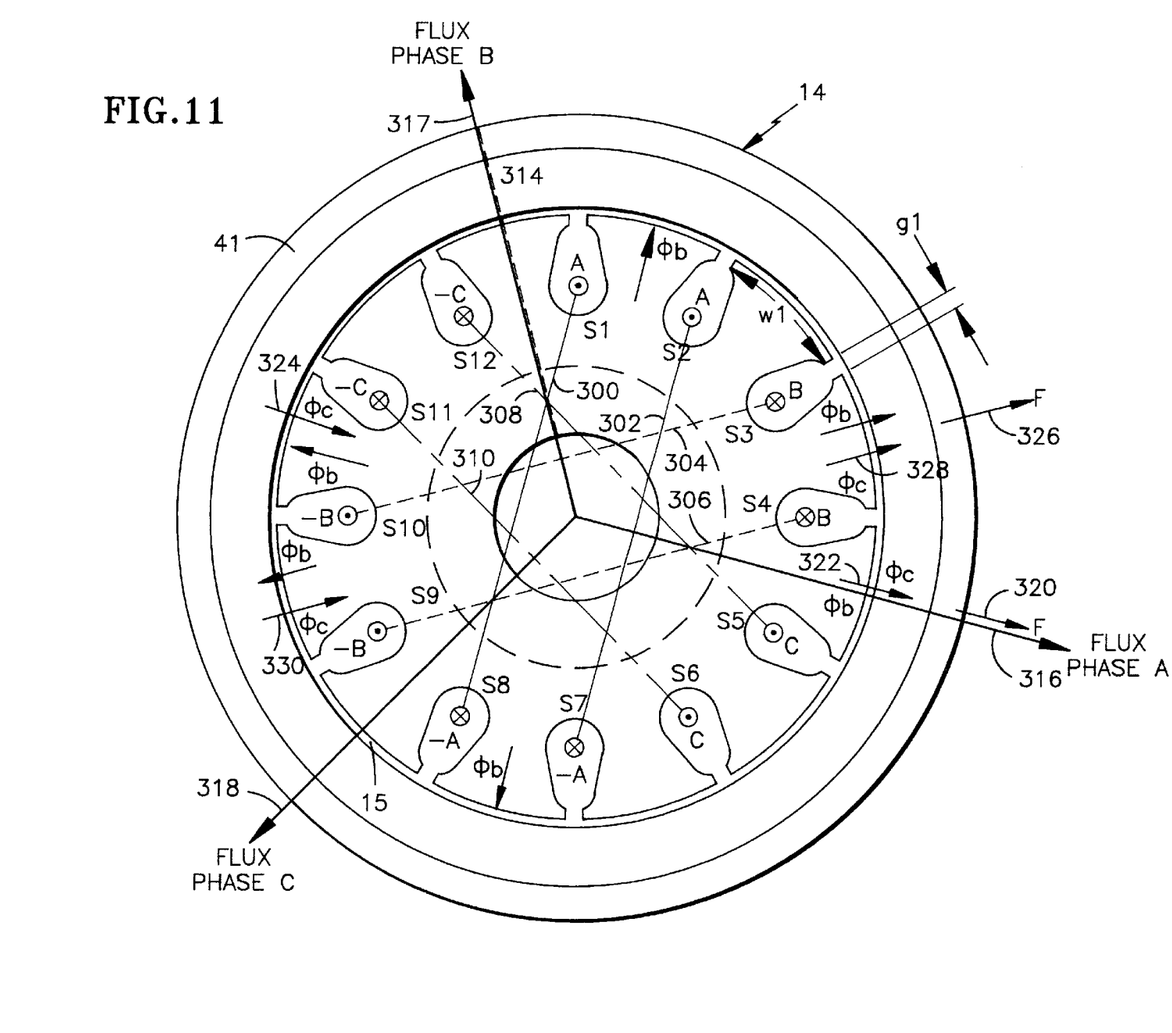
FIG. 11 is a top cutaway view of a magnetic bearing having a 12 tooth stator with a winding configuration in accordance with the present invention.
Figure 12:
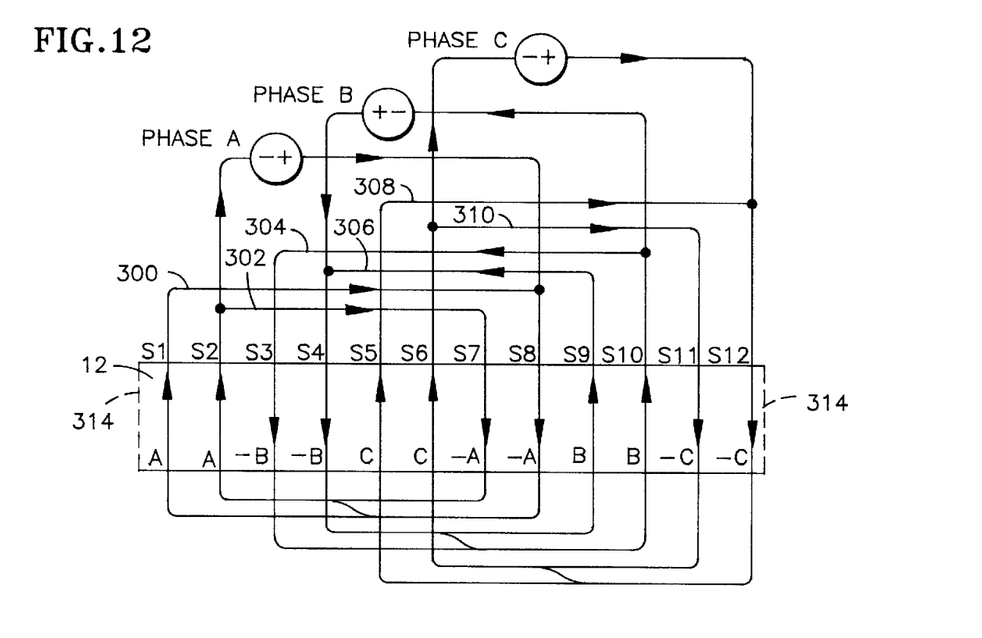
FIG. 12 is a side laid-out view of the 12 tooth stator of FIG. 11 showing the winding connections, in accordance with the present invention.

Referring now to FIGS. 11 and 12, a twelve (12) tooth stator having three phase coil windings of the present invention is shown. In particular, a three phase winding configuration has a first phase A comprising two coils 300, 302 wrapped through opposing slots. More specifically, for phase A, the coil 300 is wrapped through the slots S1, S8 and the coil 302 is wrapped through the slots S2, S7. The coils 300, 302 of Phase A are also connected together in series, parallel, or mixed, to form Phase A as indicated in FIG. 12. Similarly, the winding configuration has a second phase B comprising two coils 304, 306 wrapped through opposing slots. More specifically, for phase B, the coil 304 is wrapped through the slots S3, S10, and the coil 306 is wrapped through the slots S4, S9. The coils 304, 306 of Phase B are also connected together in series, parallel, or mixed, to form Phase B as indicated in FIG. 12. Similarly, the winding configuration has a third phase C comprising two coils 308, 310 wrapped through opposing slots. More specifically, for phase C, the coil 308 is wrapped through the slots S5, S12, and the coil 310 is wrapped through the slots S6, S11. The coils 308, 310 of Phase C are also connected together in series, parallel, or mixed, to form Phase C as indicated in FIG. 12. The stator tooth design is the same as that described hereinbefore with FIG. 5.

Figure 13:
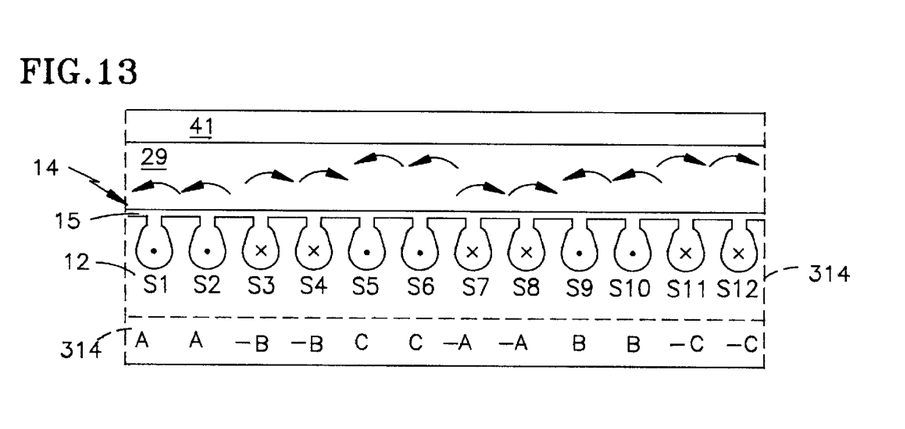
FIG. 13 is a top laid-out view of the 12 tooth stator of FIG. 11 showing the current directions, in accordance with the present invention.

Referring to FIG. 13, a top view of the 12 tooth stator of FIG. 11 cut at a line 314 and laid out flat (as in FIG. 12) is shown. As discussed hereinbefore, electrical current flowing through a given slot (S1–S12) out of the page is designated by a dot(•) and current flowing through a given slot (S1–S12) into the page is designated by a cross(x). Referring to FIG. 11, the direction of control flux for a given phase is perpendicular to the lines drawn on FIG. 11 for the coils for that phase. In particular, the direction for the control flux for positive Phase A is indicated by a line 316, the direction for the control flux for negative Phase B (i.e., Phase –B) is indicated by a line 317, and the direction for the control flux for positive Phase C is indicated by a line 318.

Referring now to FIGS. 11–14, if a force is exerted on the rotor 14 in the direction of a line 320 (FIG. 11), current will flow through Phase A and no current will flow through Phases B and C because the direction of the force 320 is parallel to the direction 316 of the flux for Phase A. Also, the current provided to Phase A is the same for each of the coils 300, 302 of Phase A.

Figure 14:
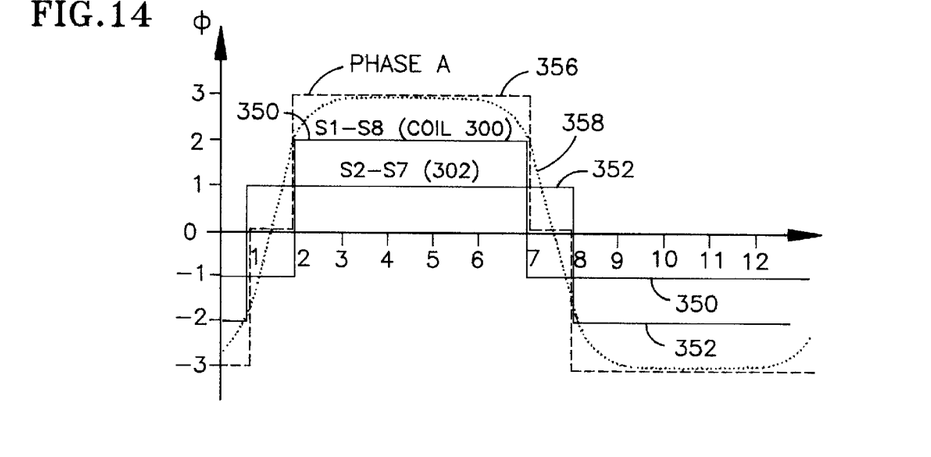
FIG. 14 is a graph of control flux along the rotor/stator gap of the 12 tooth stator magnetic bearing of FIG. 11 with one phase energized, in accordance with the present invention.

Referring to FIG. 14, the control flux generated in the gap 15 by current flowing through each of the coils 303, 302, individually, is indicated by curves 350, 352, respectively. Similar to that discussed hereinbefore with FIG. 8, the regions of the curves 350, 352 above zero indicate control flux projecting radially outward across the gap 15 (in the same direction as the bias flux) in the corresponding portions of the gap 15 shown in FIG. 13, as collectively indicated by a line 322 (FIG. 11), thereby increasing the rotor/stator attractive forces in that region of the gap 15. Symmetrically, regions of the curves 350, 352 below zero indicate control flux projecting radially inward across the gap 15 (opposite to the bias flux) in the corresponding portions of the gap 15 shown in FIG. 13, as collectively indicated by a line 324 (FIG. 11), thereby decreasing the rotor/stator attractive forces in that region of the gap 15.

As discussed hereinbefore, the area under the flux curve 352 above zero must be equal to the area of the flux curve 352 below zero. In particular, for the coil 302 and its associated flux curve 352, the flux distribution (or flux density) generated between the teeth S2–S7, looking from left to right from S2 to S7 in FIG. 13 (or looking clockwise from S2 to S7 in FIG. 11), is a large value, and the flux density generated between the teeth S7-S2, looking from left to right from S7 to S2 in FIG. 13 (or looking clockwise from S7 to S2 in FIG. 11), is a smaller value than that above the curve because the gap area (in particular, the length) over which the flux is distributed is larger. A similar relationship exists for the coil 300 and the associated flux curve 350, as indicated in FIG. 14.

If the curves 150, 152 are summed together, the total resultant flux in the gap 15 induced by Phase A is indicated by a dashed line 356. In actual practice, the edges of the waveforms 350–352 would be rounded, and the resultant flux curve will resemble a sine-wave as indicated by a dotted line 358. The positive half of the waveform 358 is a first magnetic field pole and the negative half of the waveform 358 is a second magnetic pole. Both poles assist in countering the force 320 exerted on the rotor. Thus, as the rotor 14 rotates, a given point on the rotor, such as the point 50, will see a substantially smooth two pole magnetic field, thereby reducing or eliminating large discontinuities in the control flux while also minimizing the number of changes in direction of the control flux in the gap 15. Thus, this embodiment of the present invention also reduces the control flux induced rotor losses.

Figure 15:
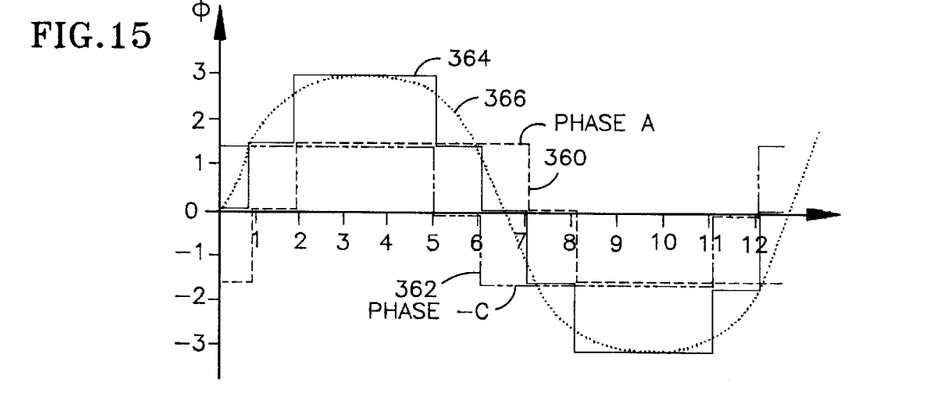
FIG. 15 is a graph of control flux along the rotor/stator gap of the 12 tooth stator magnetic bearing of FIG. 11 with two phases energized, in accordance with the present invention.

Referring to FIG. 15, the two-pole magnetic control flux field of the present invention may be directed to any position around the circumference of the gap 15 by adjusting the current supplied to the coils, and, thus, the flux generated by the coils, of the three Phases A,B,C, similar to that discussed hereinbefore with the two phase 16 tooth stator. In particular, if a force is exerted on the rotor 14 in a direction 30 degrees between the flux directions of the Phase A and Phase –C coils, as indicated by a line 326 (FIG. 11), Phases A and C flux is needed to counter the force but not Phase B flux because the force 326 is normal to the flux direction 317 (FIG. 11) for Phase B (or –B). In particular, the resultant flux curve for Phase A is indicated by a curve 360, and the resultant flux curve for Phase –C is indicated by a curve 362. The flux in the gap 15 will be the sum of the two Phase flux curves 360, 362, as indicated by a solid line 364. The actual flux will be rounded and the overall curve will resemble a sinewave as indicated by a dotted line 366.

As discussed hereinbefore, the region of the curve 366 above zero indicates control flux projecting radially outward across the gap 15 (in the same direction as the bias flux) in the corresponding portions of the gap 15 shown in FIG. 13, as indicated by a line 328 (FIG. 11), thereby increasing the rotor/stator attractive forces in that region of the gap 15. Symmetrically, the region of the curve 366 below zero indicates control flux projecting radially inward across the gap 15 (opposite to the bias flux) in the corresponding portions of the gap 15 shown in FIG. 13, as indicated by a line 330 (FIG. 11), thereby decreasing the rotor/stator attractive forces in that region of the gap 15.

Figure 16:
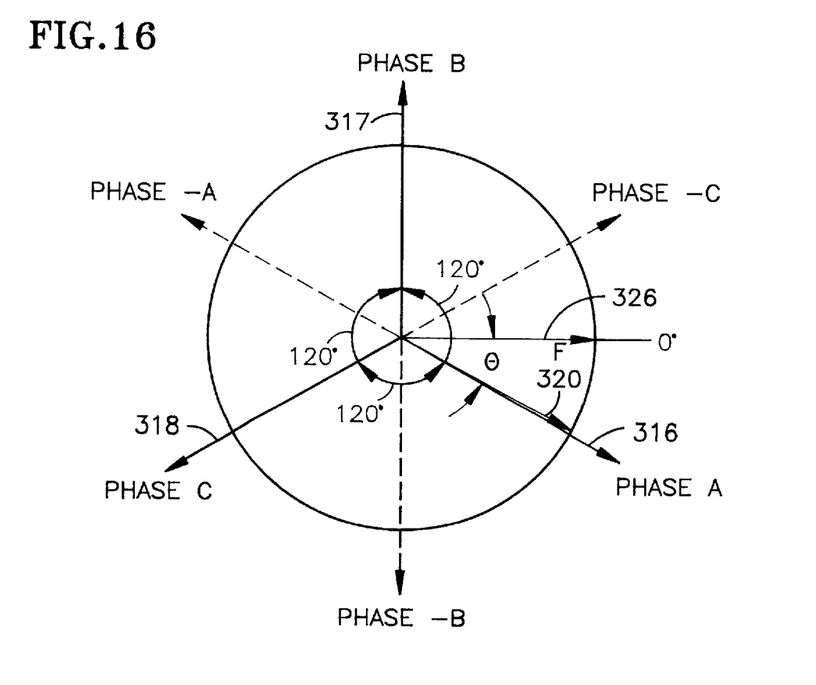
FIG. 16 is a vector graph showing force and flux vectors required for each phase of a 3 phase system, in accordance with the present invention.

Referring to FIG. 16, as discussed hereinbefore, the two pole control flux may be directed to any portion around the circumference of the gap 15 by adjusting the flux generated by the coils (and thus the current flowing through the coils) of the three Phases A, B, C. This may be illustrated by viewing the three Phases A, B, C as the three vectors 316, 317, 318 oriented 120 degrees apart. In general, the flux generated by the coils is proportional to the current flowing through the coils. If a force vector F is solely along the flux path for Phase A, as in the first example for the FIG. 11 embodiment above, only Phase A flux is used and the value of the current is determined by the amount of the force F along only the Phase A axis. If the force vector F is oriented at a angle θ between the two phases A, −C, as in the second example above of FIG. 15, the amount of current needed in phases A, C will be the vector components of the force vector F. It should be understood that to obtain certain force vectors the current in some or all of the Phases A, B, C may need to be reversed from that shown in FIGS. 11, 12, 13, such as is illustrated in the example of FIG. 15. Also, the designated polarities for the currents through the coils (and, thus, the flux) are arbitrary and some or all may be reversed if desired. For example, Phase −B could be defined as Phase +B if the current through the coils 308, 310 were reversed. It should be understood that the flux required for the three phases A, B, C, to produce a two pole magnetic field may be defined by a group of related equations. In particular, if zero degrees is defined as the line 326 in FIG. 16, i.e., where zero flux effect occurs from Phase B, then the following set of equations defines the current and, thus, the associated flux for that phase:

$$\text{Phase B flux} = M * \sin(\theta); \qquad [\text{Eq.1}]$$

$$\text{Phase A flux} = M * \sin(\theta + 120°); \text{ and} \qquad [\text{Eq.2}]$$

$$\text{Phase C flux} = M * \sin(\theta - 120°) \qquad [\text{Eq.3}]$$

Where M is a magnitude multiplier to adjust the magnitude of each phase to provide the needed peak flux to counter the force F. Therefore, for a given force vector F, there exists a set of flux vectors for the Phases A, B, C to counter such force.

Figure 17:
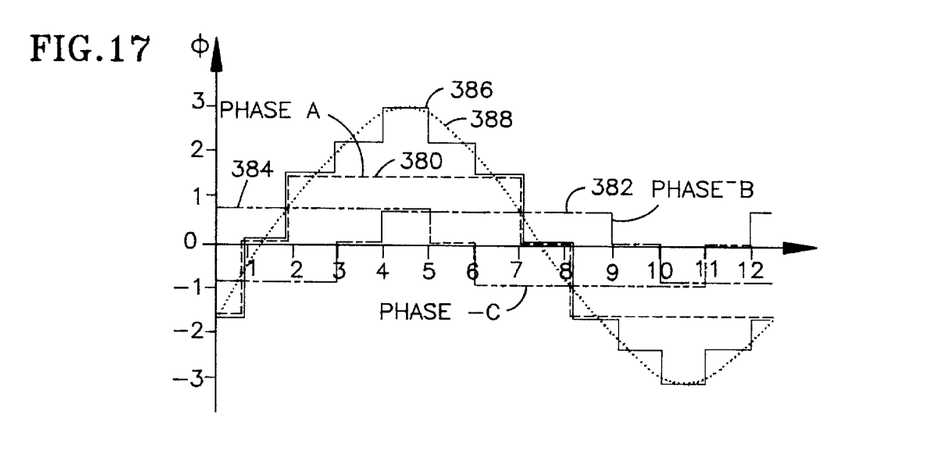
FIG. 17 is a graph of control flux along the rotor/stator gap of the 12 tooth stator magnetic bearing of FIG. 11 with three phases energized, in accordance with the present invention.

More specifically, referring now to FIGS. 16 and 17, alternatively, for the example of FIG. 14 where the force vector 320 is oriented along the Phase A flux line 316 (θ=−30 degrees), if the control flux for each of the phases (and the corresponding drive control current), is set as defined by Eqs. 1–3, the flux would be −0.5, 1.0, −0.5, for the Phases B, A, C, respectively. The Phase A flux is indicated by a dashed line 380, the Phase B flux is indicated by a line 382, and the Phase C flux is indicated by a line 384. The total control flux in the gap is indicated by a solid line 386. As discussed hereinbefore, the actual flux will be rounded and the overall curve will resemble a sinewave as indicated by a dotted line 388. In comparing FIGS. 14 and 17, it can be seen that the resultant curve 388 using three phases as opposed to only one phase in FIG. 14 is a more sinusoidal curve than that of FIG. 14. However, the profile of FIG. 14 may be acceptable for certain applications.

The rotor losses for the 16 tooth stator winding configuration of FIG. 5 of the present invention, using a tooth gap g1 of 0.658 cm, a stator tooth width W1 of 1.317 cm at the gap 15, a rotor thickness of about 2 cm, a stator outer diameter of 10.16 cm, a nominal rotor/stator airgap 15 of 0.05 cm, at three different rotor speeds, and four different external loads applied to the rotor, are shown in Table 1. These losses are compared to the prior art (P/A) design described hereinbefore with FIGS. 1–4, having a tooth gap g1 of 4.78 cm, a stator tooth width W1 of 3.22 cm at the gap 15, and the remaining dimensions are substantially the same as that described hereinbefore for FIG. 5. Also, the materials used for the comparison of the invention (Invtn) to the prior art (P/A) in Table 1 are the same as that described hereinbefore for the prior art with FIGS. 1, 2.

Although the invention has been described as using 12 and 16 teeth stators, more or fewer stator teeth may be used if desired. However, the fewer the number of teeth, the more sampled or step-like the two-pole flux sinusoidal waveform may appear and the greater the rotor losses because higher frequency components are introduced. Conversely, the more stator teeth, the smoother the sine waveform and the better the directional control.

Also, any number of phases two or greater may be used if desired. Further, the number of coils for each phase, the type of coil winding pattern, and the number of stator slots used are not restricted to that discussed hereinbefore, provided the winding configuration provides a two-pole magnetic field distribution along the gap which can be directed to any point around the gap. In particular, we have found that any coil configurations used for polyphase (two or more phase) induction motors or synchronous motors may be used, as such motors provide rotating magnetic fields. A sample of some books which describe usable winding configurations include: R. Engelman et al, "Handbook of Electric Motors", Univ. of Cincinnatic, Ohio (Dec. 1994), P. Cochran, "Polyphase Induction Motor; Analysis, Design, Application", Marcel Dexter Inc, NY (1989), C. VeInott et al, "Fractional and Subfractional Horsepower Electric Motors", McGraw Hill (1992).

Also, the shape of the field need not be a pure sinewave. For example, the field may be triangular, stepwise sinusoidal, or other shapes which meet the criteria discussed herein.

Further, it should be understood that the orientation of the stator and rotor are not critical to the operation of the present invention (i.e., the rotor may be located concentrically inside the stator). Also, the rotor and stator may rotate in the same or opposite directions relative to each other. Also, if bias flux is used, other configurations and orientations of the bias flux, the permanent magnets, and the laminations than that discussed herein may be used.

Although the invention has been described and illustrated with respect to the exemplary embodiments thereof, it should be understood by those skilled in the art that the foregoing and various other changes, omissions and additions may be made without departing from the spirit and scope of the invention.

TABLE 1

EXTERNAL LOAD = 35 LBS:

| Rotor Speed→ | 17,000 rpm | | 27,670 rpm | | 35,000 rpm | |
| --- | --- | --- | --- | --- | --- | --- |
| Losses (W) ⇓ | P/A | Invtn | P/A | Invtn | P/A | Invtn |
| Eddy current | 27 | 2 | 43 | 3 | 54 | 5 |
| Hysteresis | 17 | 3 | 39 | 6 | 58 | 9 |
| Total Loss: | 44 | 5 | 82 | 9 | 112 | 14 |
| Improvement: | | 9:1 | | 8.5:1 | | 8:1 |

EXTERNAL LOAD = 70 LBS:

| Rotor Speed→ | 17,000 rpm | | 27,670 rpm | | 35,000 rpm | |
| --- | --- | --- | --- | --- | --- | --- |
| Losses (W) ⇓ | P/A | Invtn | P/A | Invtn | P/A | Invtn |
| Eddy current | 33 | 4 | 52 | 6 | 68 | 9 |
| Hysteresis | 19 | 10 | 42 | 17 | 63 | 23 |
| Total Loss: | 52 | 14 | 94 | 23 | 131 | 32 |
| Improvement: | | 3.7:1 | | 4:1 | | 4:1 |

EXTERNAL LOAD = 105 LBS:

| Rotor Speed→ | 17,000 rpm | | 27,670 rpm | | 35,000 rpm | |
| --- | --- | --- | --- | --- | --- | --- |
| Losses (W) ⇓ | P/A | Invtn | P/A | Invtn | P/A | Invtn |
| Eddy current | 40 | 6 | 64 | 11 | 81 | 18 |
| Hysteresis | 22 | 21 | 49 | 36 | 73 | 45 |
| Total Loss: | 62 | 27 | 113 | 47 | 154 | 63 |
| Improvement: | | 2.4:1 | | 2.4:1 | | 2.4:1 |

EXTERNAL LOAD = 140 LBS:

| Rotor Speed→ | 17,000 rpm | | 27,670 rpm | | 35,000 rpm | |
| --- | --- | --- | --- | --- | --- | --- |
| Losses (W) ⇓ | P/A | Invtn | P/A | Invtn | P/A | Invtn |
| Eddy current | 51 | 10 | 77 | 22 | 103 | 33 |
| Hysteresis | 27 | 39 | 55 | 63 | 88 | 81 |
| Total Loss: | 78 | 49 | 132 | 85 | 191 | 114 |
| Improvement: | | 1.6:1 | | 1.6:1 | | 1.7:1 |

We claim:

1. A magnetic bearing, comprising:

a stator;

a rotor, concentrically located with respect to said stator, which rotates relative to said stator, and there being a rotor/stator gap between said rotor and said stator; and winding means disposed on said stator for providing a directable two-pole magnetic field distribution along said gap which can be directed to any point along the circumference of said gap, said distribution being distributed along the entire circumference of said gap.

2. The bearing of claim 1 wherein said winding means comprises at least two phases.

3. The bearing of claim 1 wherein said two-pole magnetic field distribution along said gap is substantially sinusoidal.

4. The bearing of claim 1 wherein said stator comprises a plurality of stator teeth and a plurality of stator slots each slot being between adjacent ones of said stator teeth.

5. The bearing of claim 4 wherein said stator comprises 16 slots.

6. The bearing of claim 4 wherein said slots at said rotor/stator gap are set to a minimum distance to minimize losses in said rotor.

7. The bearing of claim 1 further comprising bias flux means for generating a magnetic bias flux between said rotor means and said stator means across said rotor/stator gap.

8. A magnetic bearing, comprising:

a stator, having a plurality of stator teeth and a plurality of stator slots each slot being between adjacent ones of said stator teeth;

a rotor, concentrically located with respect to said stator, which rotates relative to said stator, and there being a rotor/stator gap between said rotor and said stator; and stator windings, wrapped through said stator slots so as to provide a directable two-pole magnetic field distribution along the circumference of said gap which can be directed to any point along said gap, said distribution being distributed along the entire circumference of said gap.

9. The bearing of claim 8 wherein said windings comprise at least two phases.

10. The bearing of claim 8 wherein said two-pole magnetic field distribution along said gap is substantially sinusoidal.

11. The bearing of claim 8 wherein said stator comprises 16 slots.

12. The bearing of claim 8 wherein said slots at said rotor/stator gap are set to a minimum distance to minimize losses in said rotor.

13. The bearing of claim 8 further comprising bias flux means for generating a magnetic bias flux between said rotor means and said stator means across said rotor/stator gap.

* * * * *

UNITED STATES PATENT AND TRADEMARK OFFICE
CERTIFICATE OF CORRECTION

PATENT NO. : 5,821,656
DATED : October 13, 1998
INVENTOR(S) : Roy S. Colby & Zbigniew Piech It is certified that error appears in the above-identified patent and that said Letters Patent is hereby corrected as shown below:

Column 14, claim 8, line 40, delete "the circumference of"; and
Column 14, claim 8, line 41, after the word "along" and before the word "said" insert --the circumference of--.

Signed and Sealed this

Twenty-third Day of February, 1999

Attest:

Q. TODD DICKINSON

*Attesting Officer*  *Acting Commissioner of Patents and Trademarks*